US011010903B1

(12) United States Patent
Gallaudet et al.

(10) Patent No.: US 11,010,903 B1
(45) Date of Patent: May 18, 2021

(54) COMPUTER VISION AND MACHINE LEARNING TECHNIQUES FOR ITEM TRACKING

(71) Applicant: Amazon Technologies, Inc., Seattle, WA (US)

(72) Inventors: Elisha Gallaudet, Andover, MA (US); Timothy Stallman, Groton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/262,685

(22) Filed: Jan. 30, 2019

Related U.S. Application Data

(60) Provisional application No. 62/716,877, filed on Aug. 9, 2018.

(51) Int. Cl.
*G06T 7/20* (2017.01)
*G06K 9/00* (2006.01)
*B65G 1/137* (2006.01)
*H04N 5/247* (2006.01)
*G05B 13/02* (2006.01)

(52) U.S. Cl.
CPC ............ *G06T 7/20* (2013.01); *B65G 1/137* (2013.01); *G05B 13/0265* (2013.01); *G06K 9/00335* (2013.01); *G06K 9/00624* (2013.01); *G06K 9/00718* (2013.01); *G06K 9/00744* (2013.01); *G06T 2207/10016* (2013.01); *G06T 2207/20076* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 9,171,278 B1* | 10/2015 | Kong | ............... | B65G 1/137 |
| 9,230,250 B1* | 1/2016 | Parker | ............... | G06Q 30/0185 |
| 10,341,648 B1* | 7/2019 | Fonte | ............... | H04N 17/004 |
| 10,607,086 B1* | 3/2020 | Grady | ............... | G06F 16/958 |
| 2007/0092143 A1* | 4/2007 | Higgins | ............... | G06K 9/00785 |
| | | | | 382/228 |
| 2016/0244262 A1* | 8/2016 | O'Brien | ............... | G06Q 10/087 |
| 2018/0012462 A1* | 1/2018 | Heitz, III | ............... | G08B 13/19606 |
| 2018/0084310 A1* | 3/2018 | Katz | ............... | G06N 3/08 |
| 2018/0255943 A1* | 9/2018 | Bacallao | ............... | A47F 9/04 |
| 2018/0305123 A1* | 10/2018 | Lert, Jr. | ............... | G05D 1/0088 |
| 2019/0213212 A1* | 7/2019 | Adato | ............... | G06F 16/235 |
| 2019/0258851 A1* | 8/2019 | Rajan | ............... | G06T 7/20 |
| 2019/0258878 A1* | 8/2019 | Koivisto | ............... | G05D 1/00 |

(Continued)

*Primary Examiner* — Thomas Randazzo
(74) *Attorney, Agent, or Firm* — Patterson + Sheridan, LLP

(57) ABSTRACT

Techniques are described for processing digital video data using one or more machine learning models to determine an outcome of an item placement operation within a fulfillment center environment. Video data is processed using one or more machine learning models to determine an estimated likelihood that an occurrence of a particular fulfillment center operation is depicted within the two or more instances of digital video data. Upon determining that the estimated likelihood exceeds a predefined threshold confidence level, the video data is processed using second one or more machine learning models to determine a bin placement prediction and a confidence value. A data repository for a control system for the fulfillment center environment is updated, based on the bin placement prediction and the confidence value.

20 Claims, 11 Drawing Sheets

(56) References Cited

U.S. PATENT DOCUMENTS

2019/0258902 A1\* 8/2019 Colligan .............. G06K 9/6262
2019/0384981 A1\* 12/2019 Swaminathan ...... G06K 9/6256
2020/0265229 A1\* 8/2020 Badr ....................... G06T 7/248

\* cited by examiner

COMPUTER VISION AND MACHINE LEARNING TECHNIQUES FOR ITEM TRACKING

BACKGROUND

Modern inventory systems, such as those in mail-order warehouses, supply chain distribution centers, and custom-order manufacturing facilities, face significant challenges in responding to requests for inventory items. Even in highly automated product distribution environments, an associate may be required to manually place products onto machine-operated storage systems as part of a product distribution workflow. Conventional systems can require associates to manually enter information for each item they are interacting with (e.g., by scanning a barcode on the item), and in some cases associates may be required to enter multiple pieces of information (e.g., multiple barcodes) for a single item. Moreover, once an associate places the item in its destination location, conventional solutions may again require the associate to enter information associated with the destination location (e.g., by scanning a barcode affiliated with a particular bin). However, each of these manual transactions can affect efficiency (e.g., the number of items processed within a given period of time) and increases the likelihood a problem will occur (e.g., the barcode for the wrong bin being scanned).

DETAILED DESCRIPTION

Inventory systems are utilized by many entities for storing and managing inventory. For example, some retailers may utilize a warehouse of racks that store inventory items in various bins. When an order for a specific inventory item needs to be filled by the retailer, an associate typically retrieves the inventory item from the bin where the inventory item is stored.

Inventory systems according to one embodiment described herein utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a station for performing inventory operations such as stowing new inventory in the inventory holders and removing desired inventory items from the inventory holders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

One challenge of the stowing and picking processes is collecting information associated with inventory movement into and out of the inventory holders. For example, when an item is removed from a storage bin and places the item in a particular bin of a shelving unit, the management system for the automated workflow may need to know which item was moved, which storage bin the item was retrieved from and which bin on the shelving unit the item was placed in. Conventional systems require associates to scan a barcode (and sometimes multiple barcodes) or otherwise enter information identifying each item they, process. These manual scanning operations can impact efficiency and accuracy.

Figure 1:
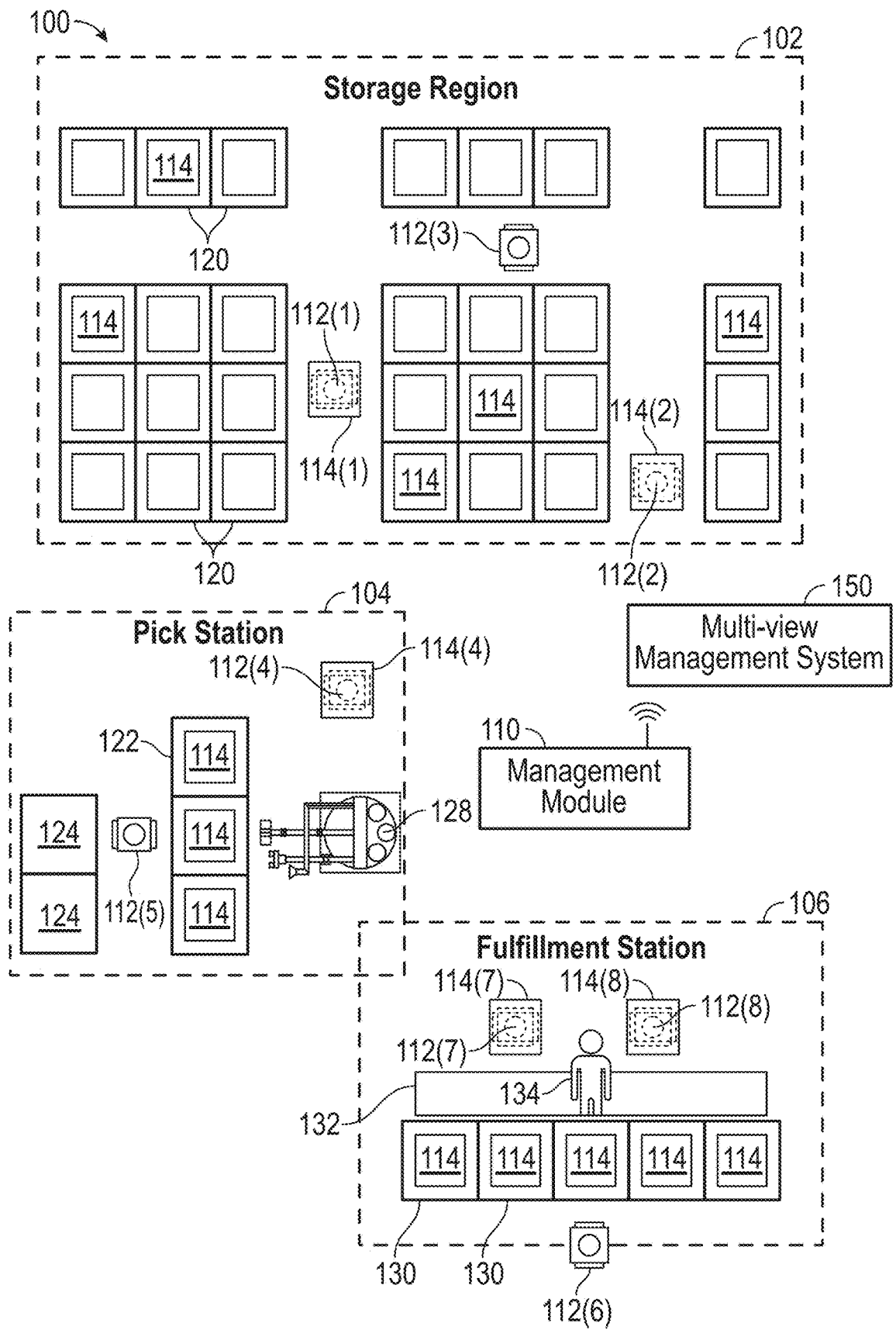
FIG. 1 illustrates an inventory system having multiple regions and mobile drive units that carry inventory holders about the regions, according to one embodiment described herein.

FIG. 1 illustrates an inventory system having multiple regions and mobile drive units that carry inventory holders about the regions. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and a fulfillment station 106. In practice, depending upon the size of the inventory system 100, the warehouse may hold more than one of the storage regions 102, pick stations 104, and fulfillment stations 106, or the warehouse may be configured without the storage region 102, or the pick station 104, or the fulfillment station 106.

The inventory system 100 includes a management module 110 (also referred to herein as a control system), multiple mobile drive units 112, inventory holders 114 and a training system 150. Only some of the inventory holders 114 are shown referenced with the number 114 for ease of illustration. The mobile drive units 112 are independent, self-powered robotic devices that may move freely about the warehouse, under their own direction or through coordination by the management module 110. The mobile drive units 112 may be used at various times to transport the inventory holders 114 around the warehouse among the regions. For instance, the mobile drive units 112 may transport the inventory holders 114 between the storage region 102 and the pick station 104 or fulfillment station 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold various types and sizes of items.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112, Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a robotic picking arm 128 picks inventory from the inventory holders 114 at the pick locations 122 and loads them into boxes or containers supported by, another inventory holder 114(4) mounted on a mobile drive unit 112(4). In one embodiment, the robotic picking arm 128 can be configured with one or more suction device end effectors for use in picking up items from the inventory holders 114. A second line of two staging locations 124 is mapped adjacent to, but spaced from, the first line of pick locations 122. The staging locations 124 temporarily hold inventory holders 114 on the way to and from the pick locations 122 of the pick station 104, It is noted that five locations are merely representative, and that pick stations 104 may be designed with more or fewer than five locations.

Order holders may, for example, be racks of shelving that are configured to hold boxes or containers that will be used to fill orders for inventory items, Each box or container may be associated with a particular order. For instance, an order holder may store a cardboard box that is to be used for shipping an order for several ink cartridges and several reams of paper, Order holders with orders needing such items may visit positions along the fulfillment station corresponding to inventory holders storing inventory items needed by the orders, Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the fulfillment station. An order for several packages of paper and an ink cartridge may be filled by moving an order holder a location along the fulfillment station opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the fulfillment station, a mobile drive unit may transport the order holder to an inventory station, where another mobile drive unit may transport an inventory holder containing the printer so that the order can be filled.

In FIG. 1, the fulfillment station 106 is shown with multiple designated pick locations 130 to accommodate the inventory holders 114, Five pick locations 130 are illustrated to accommodate five corresponding holders 114, although there may be more or fewer pick locations per fulfillment station 106. One mobile drive unit 112(6) is shown at the fulfillment station 106 to shuffle inventory holders 114 among the locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (for example, an associate). In this example, the inventory holders 114(7) and 114(7) may be holding packages or containers for order fulfillment, where the picker 134 removes selected items from the inventory holders 114 positioned in locations 130 and loads the items into order containers on the inventory holders 114(7) and 114(8).

In some implementations, multiple mobile drive units may be used to bring inventory holders to and from the pick locations 130 of the fulfillment station 106. Incoming inventory holders may be placed in temporary locations while a single mobile drive unit, such as unit 112(6), removes an existing inventory holder that has been recently picked by the picker 134 from a pick location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, fulfillment station 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.10, Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system TOO. Depending on the component and the task to be completed, a particular task assignment may identify locations, components, and/or actions associated with the corresponding task and/or any other appropriate information to be used by the relevant component in completing the assigned task. In one embodiment, the management module 110 is configured to control one or more robotic picking arms (e.g., at pick station 104) that retrieve specific items from a first location and place these items at a destination location.

The management module 110 can collect and manage information on the items being processed. For example, the management module 110 could receive a unique identifier(s) (e.g., data from one or more scans of barcodes on the item) for an item being processed and could receive data identifying a location where the item has been placed (e.g., data from one or more scans of barcodes associated with a storage location). The management module 110 could maintain this information so that the management module 110 knows the current location of each item in the inventory system 100. However, as discussed above, manual bin and item scanning add inefficiency to the workflow.

As such, embodiments described herein provide an improved station environment that improves efficiency within the fulfillment center environment. One embodiment provides a station environment that includes a display screen for providing an improved graphical user interface, an automated storage container management system, a bin illumination system and an automated item scanning system. The automated storage container management system can detect when containers are placed or removed from their positions. The automated storage container management system can be equipped with automated scanners that track induction or packing containers without manually scanning each item and container.

Additionally, capacitive touch lighting systems can be deployed at various physical locations within the station environment. Such capacitive touch lighting systems can display various colors that correspond to workflow functions the employee should perform at the corresponding physical location within the station environment. For example, a red light being displayed could indicate that a particular storage container is empty and should be replaced with a new storage container of items. As another example, a green light being displayed could indicate that the corresponding container still contains one or more items to be processed by the employee. Of course, such examples are without limitation and are provided for illustrative purposes only, and more generally any suitable lighting system or workflow operations can be used, consistent with the functionality described herein.

Additionally, the bin illumination system can include a projection device that can project an image (e.g., a white rectangle) onto a storage bin(s) on a shelving unit where a particular item should be placed. As another example, the bin illumination system could include a bin illumination device could project an image (e.g., a purple rectangle) onto a storage bin(s) that is currently full, indicating bins where the associate should not attempt to place the particular item. Doing so allows the employee to quickly identify available and unavailable bins within the shelving unit.

Additionally, the automated item scanning system can provide a fixed scanning device (e.g., an over-head mounted scanning device) that can scan multiple barcodes on an item simultaneously (or in short succession of one another). Such an item scanning system can be mounted in a fixed location and employees can pass the item under the scanner, thereby eliminating the need for the employee to manually scan each item (potentially multiple times), thereby reducing scan time and providing a more natural workflow for the employee. That is, while conventional solutions may require employees to utilize a handheld scanning device, embodiment described herein eliminate the need for any such handheld device, thereby allowing employees to move more naturally and to use both hands in performing their functions.

Figure 2:
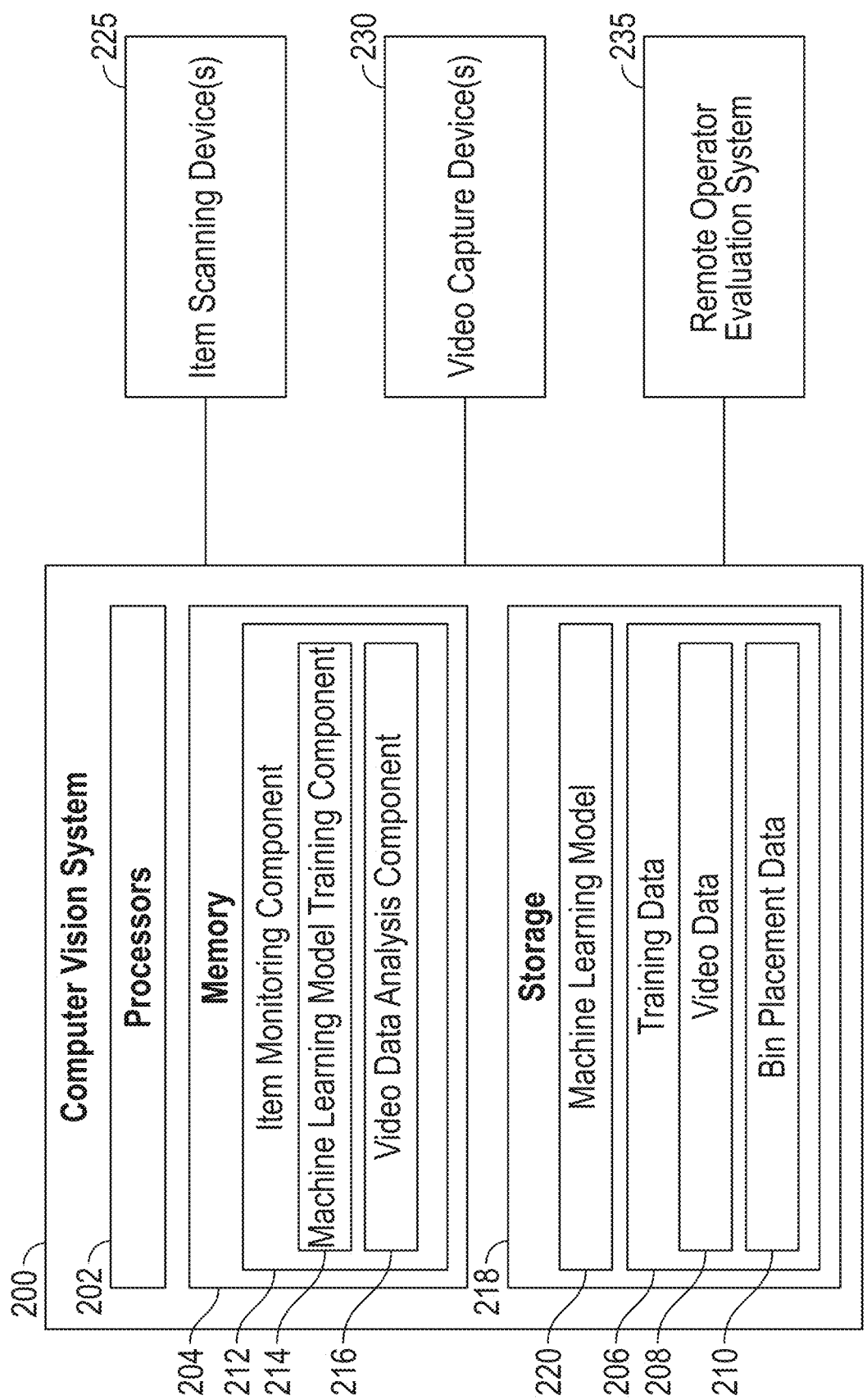
FIG. 2 is a block diagram illustrating a computing system configured with an item monitoring component, according to one embodiment described herein.

FIG. 2 is a block diagram illustrating a computing system configured with an item monitoring component, according to one embodiment described herein. As shown, the diagram includes a computer vision system 200, connected to an item scanning device(s) 225, video capture device(s) 230 and a remote evaluation system 235. The computer vision system 200 includes a processor 202, memory 204 (e.g., volatile, non-volatile, etc.) and storage 218. The memory 204 contains training data 206 and an item monitoring component 212. The training data 206 includes video data 208 and bin placement data 210. Generally, the video data 208 comprises one or more recorded video sequences depicting an associate performing a workflow function. For example, the video data 208 could depict an associate within a fulfillment center performing a stow operation, in which the associate takes an item from a container, passes the item in range of the item scanning device(s) 225 and places the item in a storage bin. In the depicted embodiment, the bin placement data 210 uniquely identifies the storage bin into which the operator placed the item in the corresponding video.

The machine learning model training component 214 of the item monitoring component 212 is generally configured to train the machine learning model 220 using the training data 206. Generally, the machine learning model 220 is configured to take as input video data captured by the video capture device(s) 230 and to output a bin placement value and a corresponding confidence value, indicating the estimated certainty that the input video depicts an item being placed into the bin corresponding to the bin placement value. The video data analysis component 216 can receive video from the video capture device(s) 230 and can process data corresponding to the receive video as an input to the machine learning model 220. In one embodiment, the video data analysis component 216 is configured to extract video data captured by the video capture device(s) 230 at a time range determined based on occurrences of workflow events within the environment being monitored. For example, the video data analysis component 216 could determine the starting time of the video to be the time at which the item scanning device(s) 225 scanned the item in question, and the video data analysis component 216 could determine the ending time of the video as the time when the next item was scanned by the item scanning device(s) 225.

Figure 3:
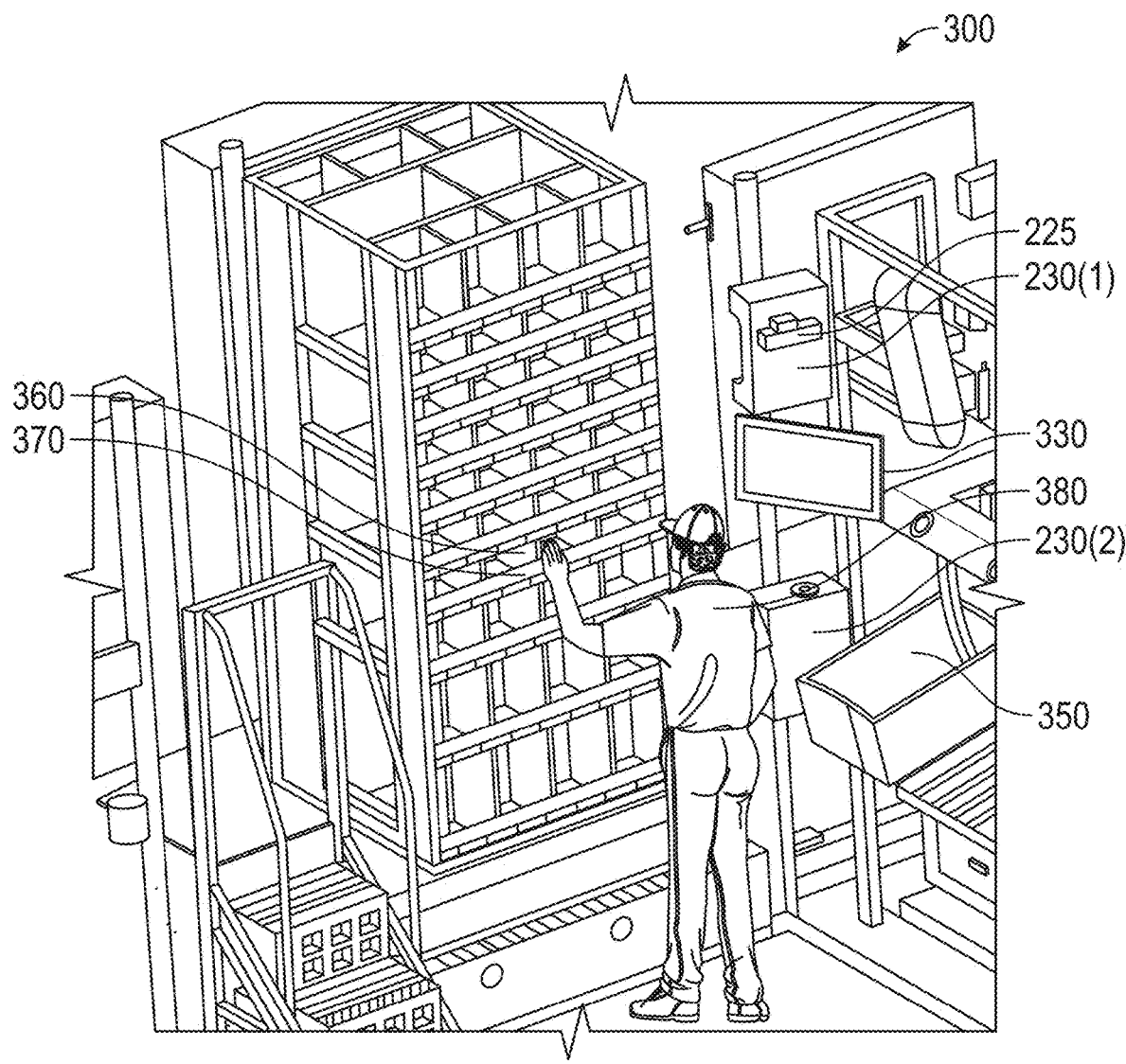
FIG. 3 is an illustration depicting an operator placing an item within a storage bin, according to one embodiment described herein.

FIG. 3 is an illustration 300 depicting an associate 380 placing an item 370 within a storage bin 360 at a station within a fulfillment center, according to one embodiment described herein. As shown, the associate 380 has retrieved the item 370 from a storage container 350 and is in the process of placing the item 370 into the storage bin 360. A graphical user interface can be rendered on the display screen 330. For example, such a graphical user interface could instruct the associate 380 on which item 370 to retrieve from the storage container 350 (e.g., by displaying a visual representation of the item 370).

The illustration 300 further depicts video capture devices 230(1)-(2), as well as the item scanning device 225. Generally, the video capture devices 230(1)-(2) can capture video frames of the associate 380 as the associate 380 retrieves the item 370 from the storage container 350 and places the item within the storage bin 360 of the shelving unit. Of note, the video capture devices 230(1)-(2) can generally represent a variety of devices capable of producing video data. For example, the video capture devices 230(1)-(2) could represent infrared scanning devices capable of capturing infrared images, visible light spectrum devices capable of generating color images (e.g., Red, Green, Blue (RGB) images), and so on. The item scanning device 225 can represent a scanning device capable of reading a barcode (or multiple barcodes, simultaneously or substantially simultaneously) on the item 370, as the associate 380 passes the item 370 within scanning range of the item scanning device 225.

Generally, the item monitoring component 212 can receive video data captured by the video capture devices 230(1)-(2). For example, the item monitoring component 212 could receive an instance of video data from each video capture device 230(1)-(2), where the start time and the stop time of the instance of video data is determined by a workflow event within the fulfillment center. For instance, the start time could be determined based on the time at which the item scanning device 225 scanned the item 370. As another example, the item monitoring component 212 could determine the stop time for the video as the time at which the item scanning device 225 scans the next item that has been brought into range of the item scanning device 225 by the associate 380.

In one embodiment, after the initial scan of the item 370 by the item scanning device 225, the item monitoring component 212 determines the stop time of the video data based on a determination that the associate 380 is no longer holding an item in his or her hand. For example, the item monitoring component 212 could periodically process images captured by the video capture device(s) 230 as inputs to a second machine learning model, where the second machine learning model is trained to classify input images into classifications that include at least an associate holding an item or an associate not holding an item. If the second machine learning model classifies a captured image as depicting an associate not holding an item and if the classification has a confidence value above a predefined threshold level of confidence, the item monitoring component 212 could determine that the associate has already placed the item 370 into the storage bin 360 and could set the stop time of the video as the time at which such a determination is made.

In any event, the video data analysis component 216 could process the captured video streams as inputs to the machine learning model 220, to determine an identifier of the storage bin 360 into which the associate 380 placed the item 370. If the video data analysis component 216 determines that the confidence value for the determined identifier of the storage bin 360 exceeds a threshold level of confidence, the video data analysis component 216 can generate and store data indicating that the item 370 is located in the storage bin corresponding to the determined identifier. Such information can then be used, for example, by one or more other components involved in managing the workflow of the fulfillment center. For example, where the item 370 has been ordered by a customer, the information on where the item 370 is stored (i.e., within the storage bin 360, in the depicted example) could be used to instruct an entity (e.g., a second associate, a robotic item picking device, etc.) involved in the fulfillment of the customer's order on where to retrieve the item 370 from.

In one embodiment, the storage bin identifier information can be used to correct incorrect item placements of the associate 380. For example, the associate 380 may have been instructed to place the item in a specific storage bin, but the associate 380 may have inadvertently placed the item into a different storage bin. In such an instance, the location of the item could be modified from the identifier of the specific storage bin where the user was instructed to place the item to instead reflect the identifier of the different storage bin where the user actually placed the item. Doing so enables the inadvertent mistake to be corrected without requiring the associate 380 to physically move the item.

If the video data analysis component 216 determines that the confidence value for the storage bin identifier output by the machine learning model 220 is less than a threshold level of confidence, the video data analysis component 216 could transmit the captured video data to the remote\evaluation system 235. A user of the remote evaluation system 235 could then review the captured video data and could determine which storage bin the video data depicts the associate 380 placing the item 370 into. The user of the remote evaluation system 235 could input the storage bin identifier into the remote evaluation system 235 and this storage bin identifier could be transmitted (e.g., across a data communications network such as the Internet) to the video data analysis component 216. The machine learning model training component 214 could then use the captured video data and the received storage bin identifier to refine the training of the machine learning model 220.

Figure 4A:
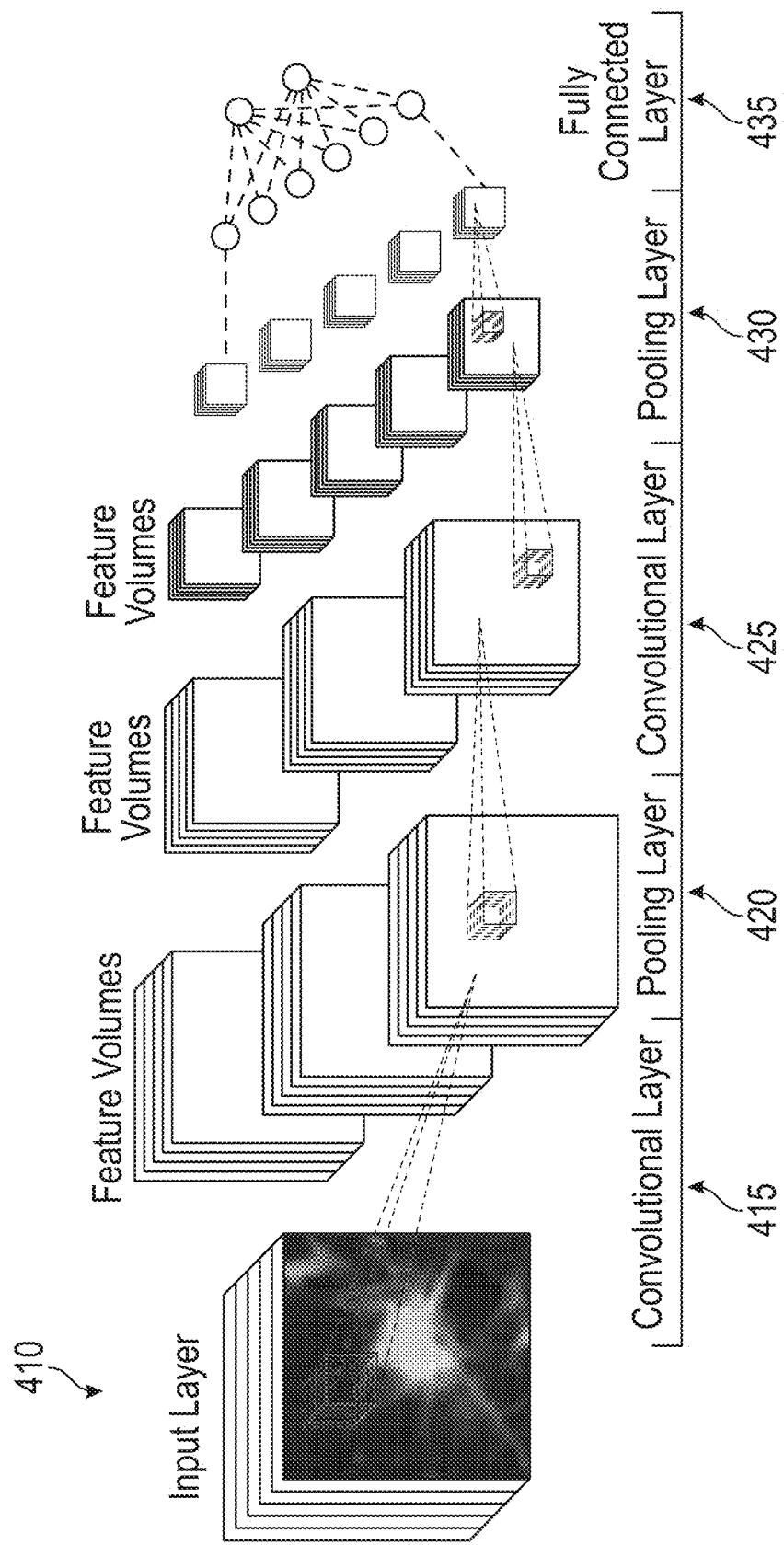
FIGS. 4A-C illustrate stages of a system for processing captured video content to determine a storage location of an item, according to embodiments described herein.
Figure 4B:
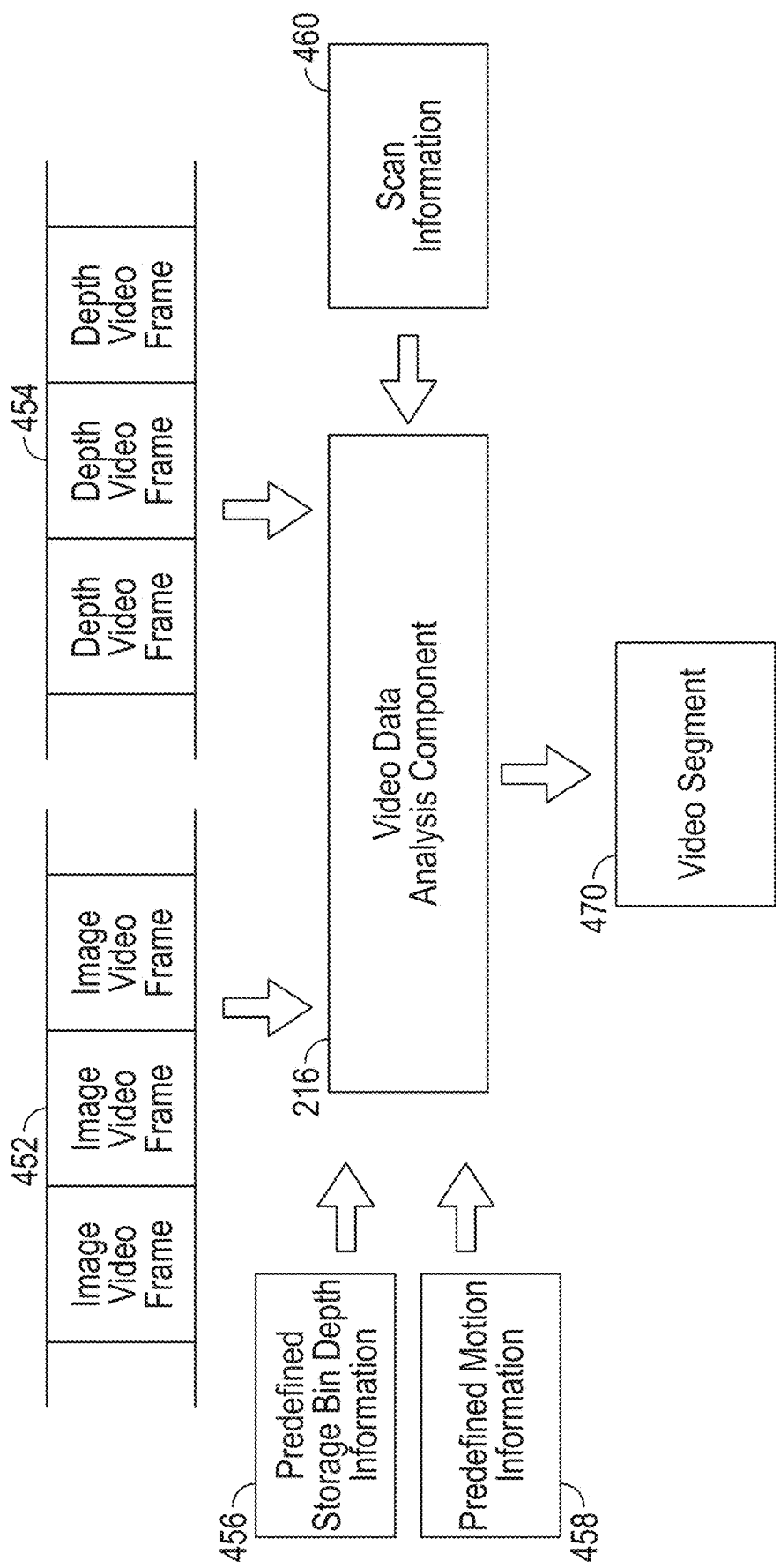

FIGS. 4A-B illustrate machine learning model architectures for processing captured video content to determine a storage location of an item, according to embodiments described herein. As shown, FIG. 4A illustrates a Convolutional 3D (C3D) neural network 400. In the depicted embodiment, the C3D neural network 400 includes an input layer 410, where captured video data is processed as an input to the network. In one embodiment, the captured video data is pre-processed before being input into the C3D neural network 400. For example, such pre-processing could include downsizing the video data to a predefined resolution. More generally, any suitable pre-processing operation(s) could be performed on the video data, consistent with the functionality described herein.

The C3D neural network 400 further contains a convolutional layer 415, followed by a pool layer 420, followed by a second convolutional layer 425 and a second pooling layer 430. Finally, the C3D neural network 400 ends with a fully connected layer 435. Of note, the depicted architecture includes the layers 415, 420, 425, 430 and 435, more generally a number of different architectures are suitable for the machine learning model 220 and the depicted architecture is provided for illustrative purposes only.

FIG. 4B illustrates a workflow for processing streaming video data to generate video segments, according to one embodiment described herein. As shown, the workflow 450 depicts two sources of streaming video data feeding into the video data analysis component 216 for processing: image video data 452 and depth video data 454. For example, the image video data 452 could comprise frames of image video data (e.g., black and white images, greyscale images, color images, etc.), captured using one or more camera devices. The depth video data 454 can comprise point clouds captured at different moments in time, and could be captured using one or more stereo camera devices (or other sensor devices suitable for capturing depth information).

Additionally, the video data analysis component 216, in the depicted embodiment, receives predefined storage bin depth information 456, predefined motion information 458 and scan information 460. Generally, the predefined storage bin depth information 456 specifies a portion of the three-dimensional scene being captured by the stereo camera devices that corresponds to the storage bins. In one embodiment, as both the stereo camera devices and storage bins are fixed in place, the predefined storage bin depth information 456 can remain constant. In a particular embodiment, software logic can be provided that is capable of identifying the storage bins within a point cloud (e.g., by a known shape of the storage bins) and such software logic can dynamically generate the predefined storage bin depth information 456.

The predefined motion information 458 generally describes the general movement performed by an associate when storing an item in a storage bin. For example, the predefined motion information 458 could include a general three-dimensional model representing the associate (or a portion of the associate, such as the associate's torso, arms, etc.). Additionally, the predefined motion information 458 could include rigging information that can define limbs, joints, movement constraints and so on of the three-dimensional model. The video data analysis component 216 can generally use the predefined motion information 458 to detect when frames of the depth video data 454 likely depict a fulfillment operation taking place (e.g., an associate storing an item within a bin). The scan information 460 represents data relating to one or more scanning operations performed using, for example, the item scanning device(s) 225.

Based on these inputs, the video data analysis component 216 can identify video segments 470 within the streams of image video data 452 and depth video data 454. For example, in one embodiment, the video data analysis component 216 could determine to begin watching for a new video segment when a scan operation is received (as indicated by the scan information 460). The video data analysis component 216 could monitor the depth video data 454 and could identify when an associate (or a portion of the associate, such as the associate's arms) appears within the frames of video data. The video data analysis component 216 could continue to monitor the video data to determine a first frame when a portion of the associate (e.g., the associate's hand) crosses a plane defined by a front face of the storage bins (e.g., as defined by the predefined storage bin depth information 456). The video data analysis component 216 could then analyze the frames of video data surrounding the first frame to determine, using the predefined motion information 458, when performance of a fulfillment operation (e.g., a stow operation) is depicted within the frames of video data. The video data analysis component 216 could then extract the frames of the video data (potentially within one or more frames leading up to the identified frames and one or more frames following the identified frames) as the video segment 470. Of course, one of ordinary skill in the art will recognize that any number of different ways of generating video segments 470 depicting the performance of fulfillment operations could be used, consistent with the functionality described herein, and the depicted embodiment is provided for illustrative purposes only and without limitation.

Figure 4C:
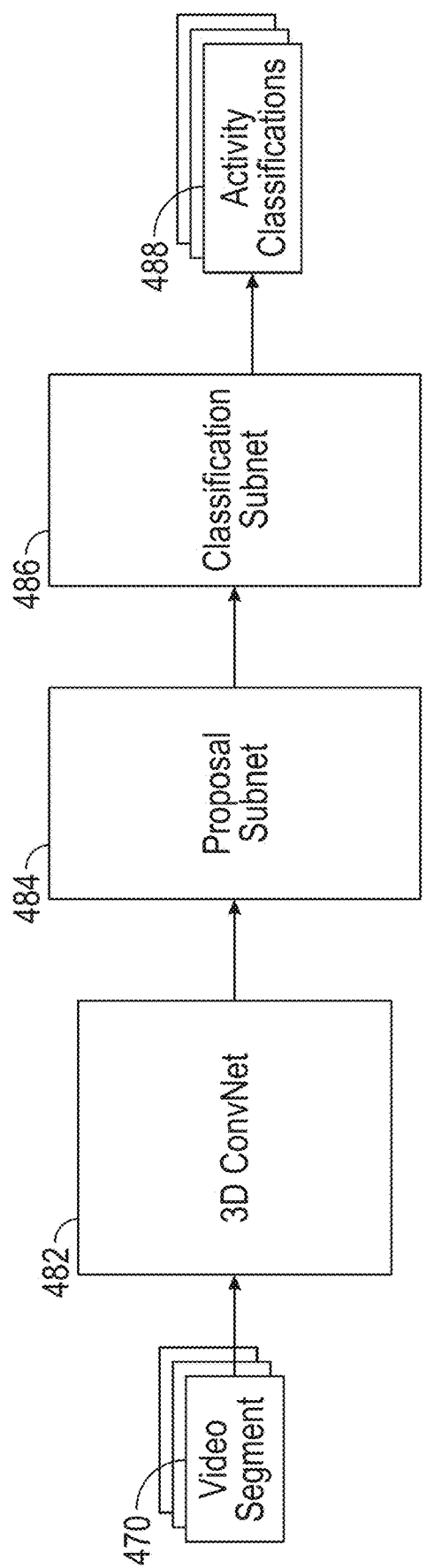

FIG. 4C illustrates a particular architecture for the machine learning model 220, where the machine learning model 220 is implemented using a Regional Convolutional 3D (R-C3D) network. As shown, the network 480 illustrates frames of input video segment 470 being processed as an input to a 3D Convolutional Network 482. Generally, the 3D Convolutional Network 482 is configured to compute convolutional features of the input frames. The computed convolutional features of the 3D Convolutional Network 482 are output to a Proposal Subnet 484. Generally, the Proposal Subnet 484 is configured to propose candidate activities of variable length that correspond to the computed convolutional features. Additionally, the Proposal Subnet 484 can provide confidence scores together with the proposed candidate activities of variable length. These proposed candidate activities and confidence scores are fed into a Classification Subnet 486, which is configured to filter the proposals and pool fixed-size features. Additionally, the Classification Subnet 486 can predict activity labels together with refined segment boundaries, as shown by output data 488.

Figure 5:
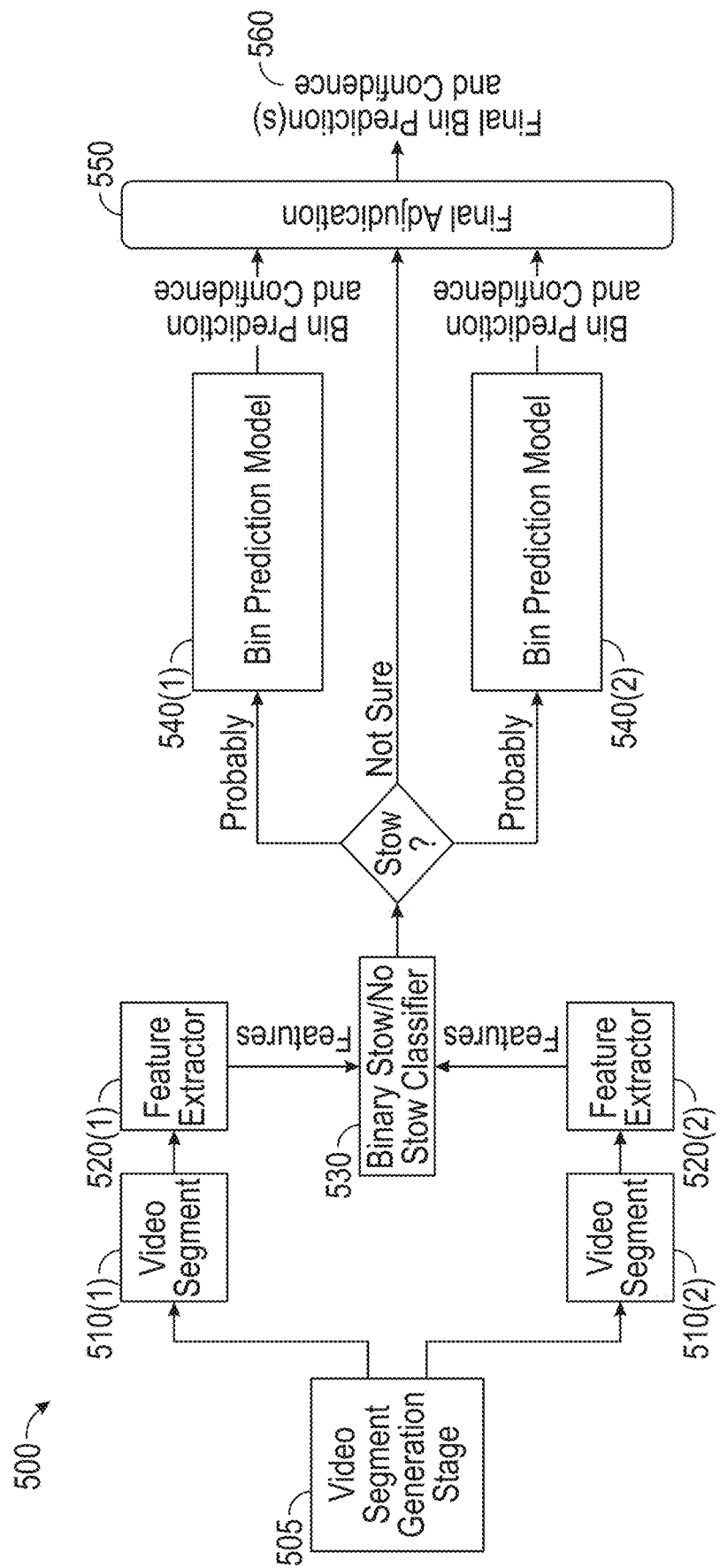
FIG. 5 illustrates a machine learning model architecture for processing multiple captured video content streams to determine a storage bin prediction for an item, according to one embodiment described herein.

FIG. 5 illustrates a machine learning model architecture for processing multiple captured video content streams to determine a storage bin prediction for an item, according to one embodiment described herein. As shown, the architecture 500 illustrates two captured video content streams 510(1)-(2) being processed as inputs to 3D Convolutional Neural Networks 520(1)-(2). The output of the 3D Convolutional Neural Networks 520(1)-(2) is then processed by a Support Vector Machine (SVM) model 530. In one embodiment, the SVM 530 is trained on the fully connected layer of the C3D neural networks 520(1)-(2). Of note, while the illustrated embodiment is configured to process two separate captured video streams, more generally any number of input video streams can be processed by expanding the depicted architecture (e.g., by adding a 3D Convolutional Network 520 and a R-C3D network 540 for each input video stream).

The SVM 530 is configured to evaluate the outputs of the C3D neural networks 520(1)-(2) and if based on the output of the SVM 530 the video data analysis component 216 determines that a sufficient probability exists that the input video data depicts a predefined fulfillment operation, the video data analysis component 216 processes the input video sequences using the R-C3D neural networks 540(1)-(2). The bin predictions and corresponding confidence values output by the R-C3D neural networks 540(1)-(2) are evaluated by the video data analysis component 216 in the final adjudication stage 550 to determine the final bin prediction(s) and final confidence value (stage 560). The item monitoring component 212 can update a data repository for a control system for the fulfillment center environment, based on the final bin prediction(s) and the corresponding final confidence values. For instance, such a control system can use the information to determine what items are stored in which bins of the storage container for use in orchestrating a workflow for the fulfillment center. As an example, the control system could generate a graphical user interface instructing an associate to retrieve a particular item from a particular bin of a storage container, as part of carrying out the fulfillment center workflow. As another example, the control system could transmit instructions to a robotic picking system, instructing the robotic picking system to retrieve the particular item from the particular bin of the storage container.

As discussed above, if the video data analysis component 216 determines that the final confidence value for the final bin prediction is less than a threshold level of confidence, the video data analysis component 216 can transmit the captured video sequences to the remote evaluation system 235 (also referred to herein as an operator system), where a user can manually review the video sequences and determine the true bin placement of the item. The machine learning model training component 214 can then use this bin placement information, together with the captured video sequences, to refine the machine learning model 220.

Figure 6:
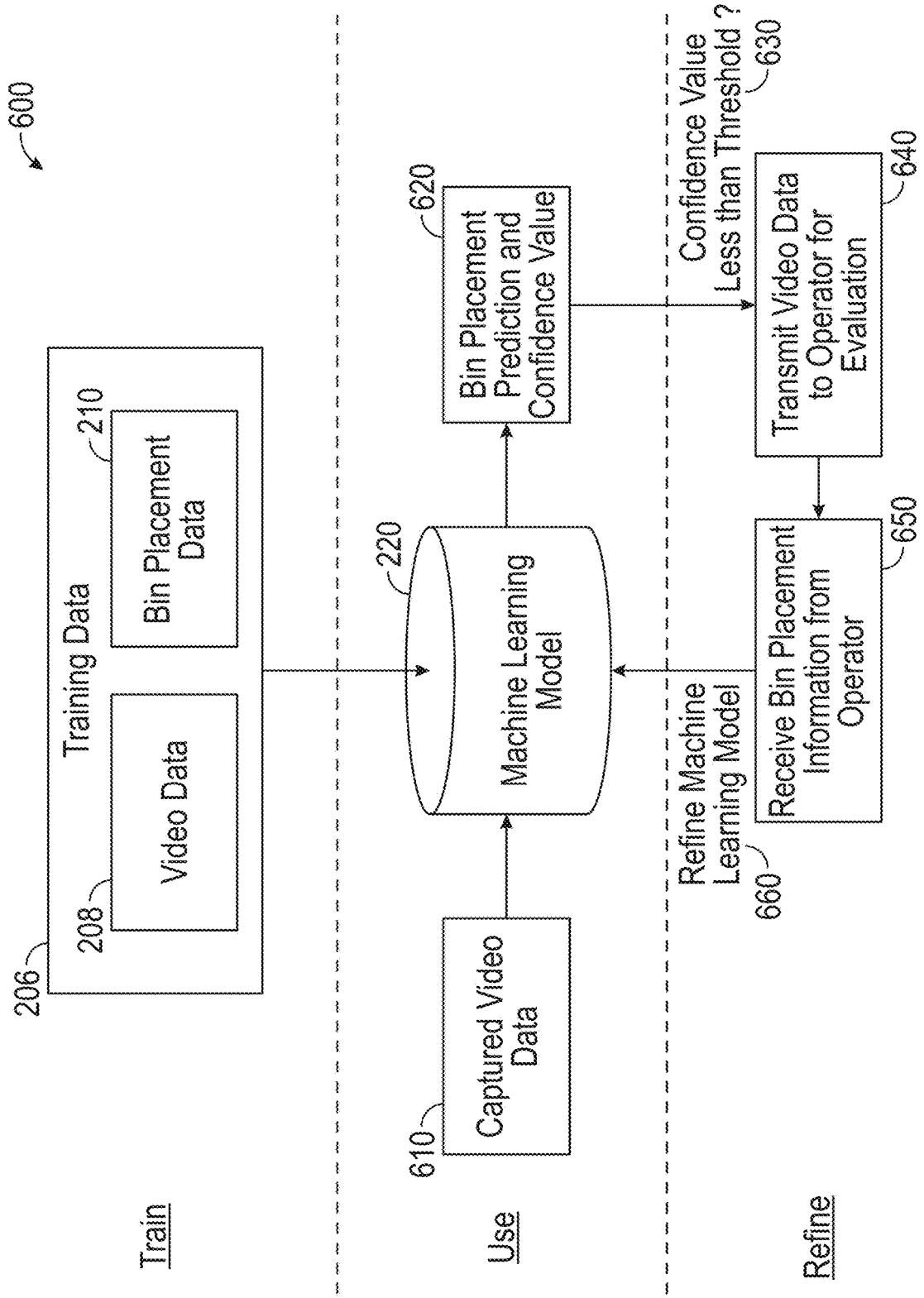
FIG. 6 is a block diagram illustrating a workflow for training, using and refining a machine learning model, according to one embodiment described herein.

FIG. 6 is a block diagram illustrating a workflow for training, using and refining a machine learning model, according to one embodiment described herein. As shown, the workflow 600 begins, where the machine learning model training component 214 uses the training data 206 (e.g., training samples) to train the machine learning model 220. As discussed above, the training data 206 can include one or more sequences of video data 208 (e.g., video data captured using video capture devices 230) and bin placement data 210, indicating which bin the item was placed into in the corresponding video data.

Once the machine learning model 220 is initially trained, the video data analysis component 216 can process captured video data 610 as an input to the machine learning model 220 to determine a bin placement prediction and a confidence value 620 corresponding to the input video data 610. If the video data analysis component 216 determines the confidence value exceeds a predefined threshold level of confidence, the video data analysis component 216 can determine that the item was placed into the determined bin and can store this placement information, e.g., for use by other systems in the fulfillment center.

If the video data analysis component 216 determines that the confidence value is less than the predefined threshold level of confidence (block 630), the video data analysis component 216 transmits the captured video data 610 for evaluation 640. For example, the video data analysis component 216 could facilitate the transmission of the captured video data across a network (e.g., the Internet) to the remote evaluation system 235, where the video data can be manually evaluated by one or more users. These one or more users can input (e.g., using one or more input devices of the remote evaluation system 235) an identifier of the bin in which the item was placed within the video data. The machine learning model training component 214 can receive the bin placement information (block 650) and can refine the machine learning model 220 using the received bin placement information and the captured video data 610 (block 660).

Figure 7:
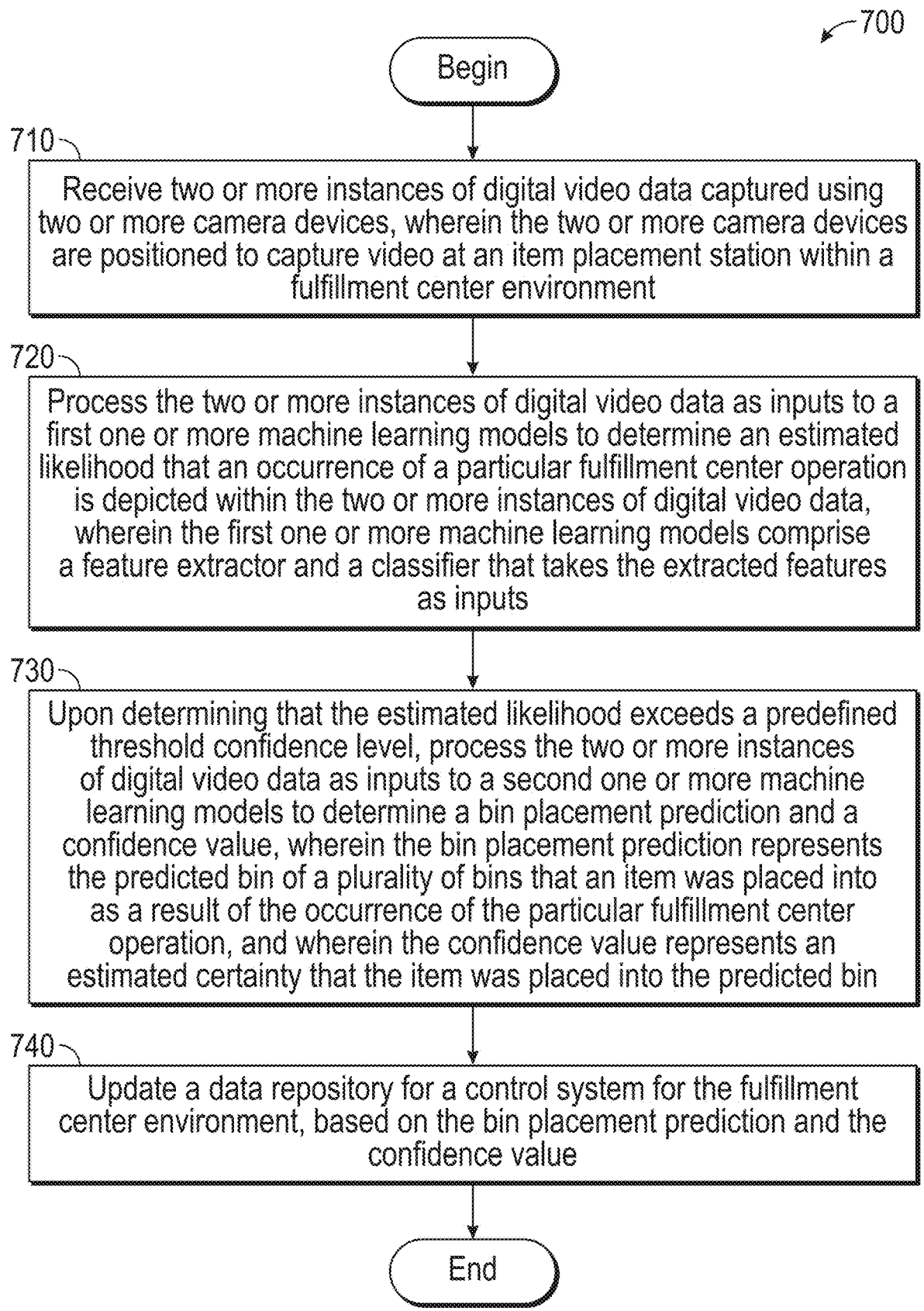
FIG. 7 is a flow diagram illustrating a method for analyzing digital video data using machine learning models to determine attributes of an operation depicted within the digital video data, according to one embodiment described herein.

FIG. 7 is a flow diagram illustrating a method for analyzing digital video data using machine learning models to determine attributes of an operation depicted within the digital video data, according to one embodiment described herein. As shown, the method 700 begins at block 710, where the item monitoring component 212 receives two or more instances of digital video data captured using two or more camera devices. In the depicted embodiment, the two or more camera devices are positioned to capture video at an item placement station within a fulfillment center environment.

The video data analysis component 216 processes the two or more instances of digital video data as inputs to a first one or more machine learning models to determine an estimated likelihood that an occurrence of a particular fulfillment center operation is depicted within the two or more instances of digital video data (block 720). In the depicted embodiment, the first one or more machine learning models comprise a Simple Vector Machine (SVM) model trained on a fully connected layer of a three-dimensional (3D) convolutional neural network.

Upon determining that the estimated likelihood exceeds a predefined threshold confidence level, the video data analysis component 216 processes the two or more instances of digital video data as inputs to a second one or more machine learning models to determine a bin placement prediction and a confidence value (block 730). In the depicted embodiment, the second one or more machine learning models comprise a Region Convolutional 3D (R-C3D) Network. Additionally, the bin placement prediction represents the predicted bin of a plurality of bins that an item was placed into as a result of the occurrence of the particular fulfillment center operation, and the confidence value represents an estimated certainty that the item was placed into the predicted bin. The item monitoring component 212 updates a data repository for a control system for the fulfillment center environment, based on the bin placement prediction and the confidence value (block 740), and the method 700 ends.

Figure 8:
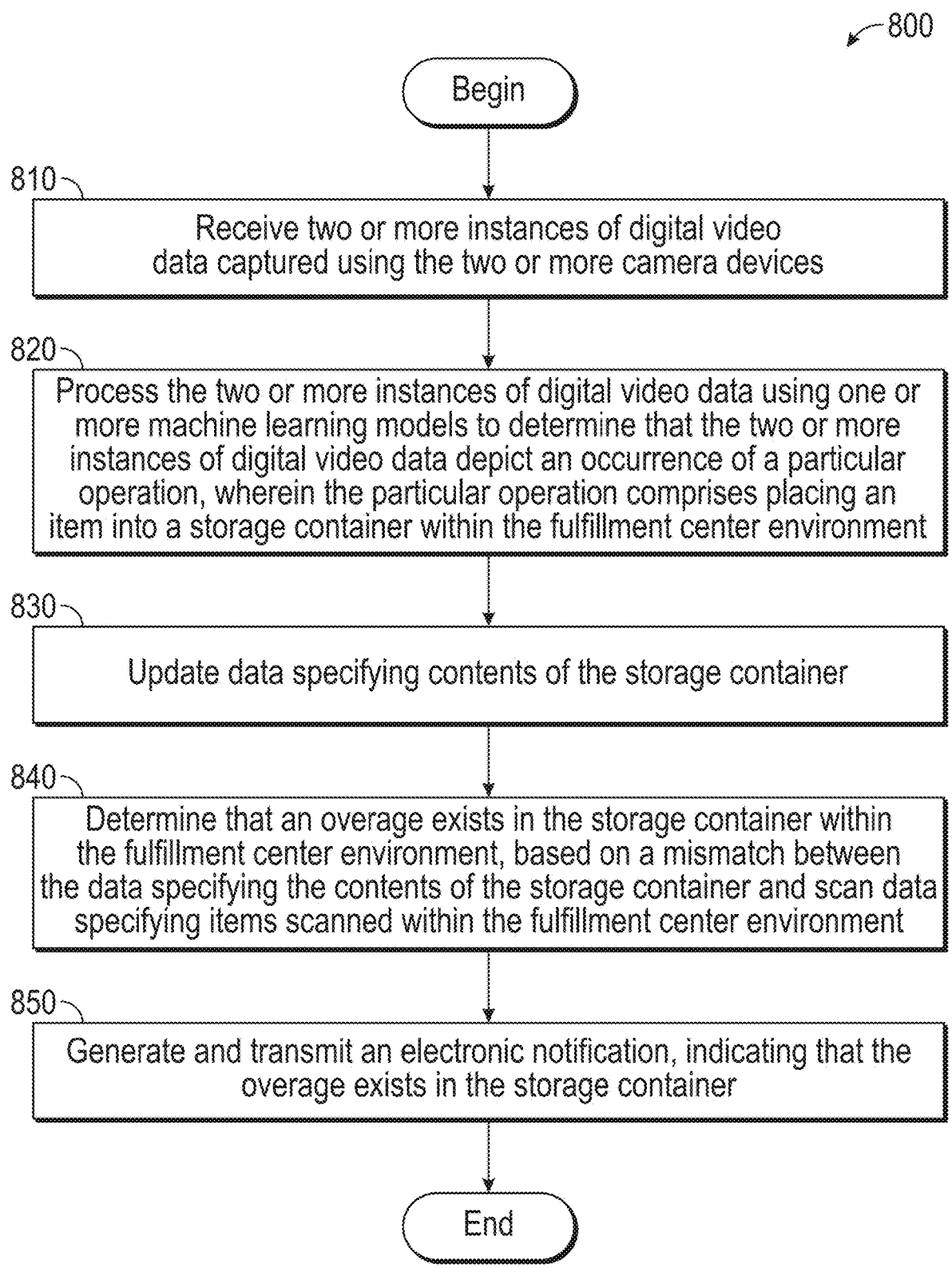
FIG. 8 is a flow diagram illustrating a method for managing an overage resulting from analyzing digital video data using machine learning models to determine attributes of an operation depicted within the digital video data, according to one embodiment described herein.

FIG. 8 is a flow diagram illustrating a method for managing an overage resulting from analyzing digital video data using machine learning models to determine attributes of an operation depicted within the digital video data, according to one embodiment described herein. As shown, the method 800 begins at block 810, where the item monitoring component 212 receives two or more instances of digital video data captured using the two or more camera devices. The video data analysis component 216 processes the two or more instances of digital video data using one or more machine learning models to determine that the two or more instances of digital video data depict an occurrence of a particular operation (block 820). In the depicted embodiment, the particular operation comprises placing an item into a storage container within the fulfillment center environment. The item monitoring component 212 updates data specifying contents of the storage container (block 830).

The item monitoring component 212 then determines that an overage exists in the storage container within the fulfillment center environment, based on a mismatch between the data specifying the contents of the storage container and scan data specifying items scanned within the fulfillment center environment (block 840). For example, an overage can exist when the system believes that only 2 copies of an item are present within a bin of a storage container, but in fact 3 copies of the item are present within the bin. This can result from, as an example, the video data analysis component 216 analyzing captured video data and incorrectly determining that one of the particular items was not placed within the bin, when in fact the item was placed into the bin. Such a scenario can be referred to as a true overage. As another example, a false overage could occur when the video data analysis component 216 incorrectly determines that the particular item was placed into the bin, but in fact the item was not placed into the bin (e.g., when an associate attempts to place the item in the bin, but then takes the item out and places the item in a different bin because the item did not fit). Upon detecting the overage exists, the item monitoring component 212 generates and transmits an electronic notification, indicating that the overage exists in the storage container (block 850) and the method 800 ends.

Figure 9:
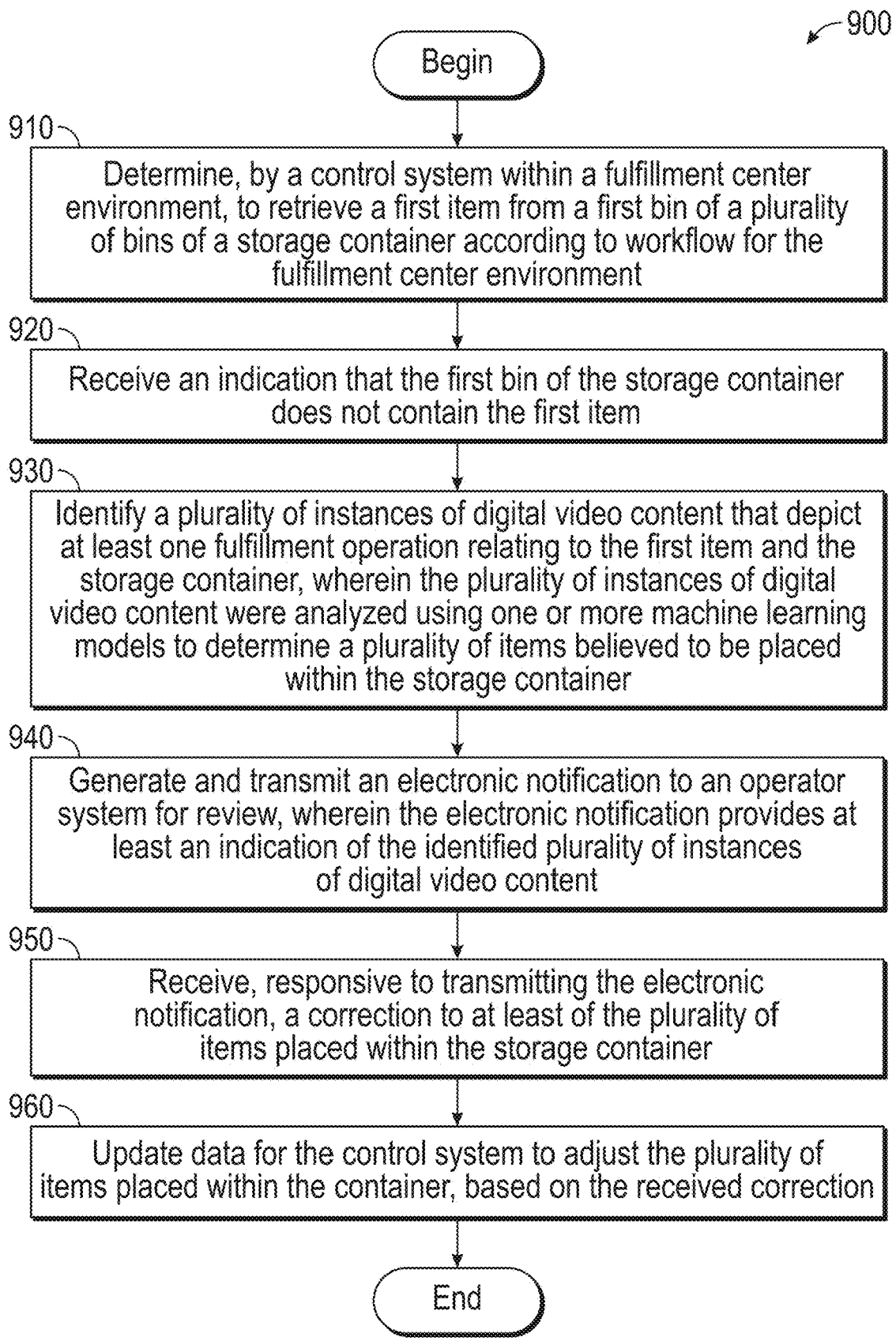
FIG. 9 is a flow diagram illustrating a method for managing a pick short resulting from analyzing digital video data using machine learning models to determine attributes of an operation depicted within the digital video data, according to one embodiment described herein.

FIG. 9 is a flow diagram illustrating a method for managing a pick short resulting from analyzing digital video data using machine learning models to determine attributes of an operation depicted within the digital video data, according to one embodiment described herein. As shown, the method 900 begins at block 910, where a control system within the fulfillment environment determines to retrieve a first item from a first bin of a plurality of bins of a storage container according to workflow for the fulfillment center environment. The control system then receives an indication that the first bin of the storage container does not contain the first item (block 920).

The item monitoring component 212 identifies a plurality of instances of digital video content that depict at least one fulfillment operation relating to the first item and the storage container (block 930). In the depicted embodiment, the plurality of instances of digital video content were analyzed using one or more machine learning models to determine a plurality of items believed to be placed within the storage container.

The item monitoring component 212 generates and transmits an electronic notification to an operator system for review (block 940). In the depicted embodiment, the electronic notification provides at least an indication of the identified plurality of instances of digital video content. The item monitoring component 212 receives, responsive to transmitting the electronic notification, a correction to at least of the plurality of items placed within the storage container (block 950). The item monitoring component 212 updates data for the control system to adjust the plurality of items placed within the container, based on the received correction (block 960), and the method 900 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving two or more instances of digital video data captured using two or more camera devices, wherein the two or more camera devices are positioned to capture video at an item placement station within a fulfillment center environment;
   processing the two or more instances of digital video data as inputs to a first one or more machine learning models to determine, based on an output of the first one or more machine learning models, an estimated likelihood that an occurrence of a particular fulfillment center operation is depicted within the two or more instances of digital video data, wherein the first one or more machine learning models comprise a feature extractor and a classifier that takes extracted features as inputs;
   upon determining that the estimated likelihood exceeds a predefined threshold confidence level, processing the two or more instances of digital video data as inputs to a second one or more machine learning models to determine a bin placement prediction and a confidence value, wherein the bin placement prediction indicates a predicted bin of a plurality of bins that an item was placed into as a result of the occurrence of the particular fulfillment center operation, and wherein the confidence value represents an estimated certainty that the item was placed into the predicted bin; and
   updating a data repository for a control system for the fulfillment center environment, based on the bin placement prediction and the confidence value.

2. The method of claim 1, wherein updating a data repository for a control system for the fulfillment center environment, based on the bin placement prediction and the confidence value further comprises:
   generating a database query configured to store an indication of the bin placement prediction and the confidence value in a database.

3. The method of claim 1, wherein the particular fulfillment center operation comprises an associate placing the item into one of the plurality of bins, wherein the plurality of bins are located on a mobile storage unit, wherein the first one or more machine learning models comprise a Simple Vector Machine (SVM) model trained on a fully connected layer of a three-dimensional (3D) convolutional neural network, and wherein the second one or more machine learning models comprise a Region Convolutional 3D (R-C3D) Network.

4. The method of claim 1, further comprising:
receiving a second two or more instances of digital video data captured using the two or more camera devices;
processing the second two or more instances of digital video data as inputs to the first one or more machine learning models to determine a second estimated likelihood that a second occurrence of the particular fulfillment center operation is depicted within the second two or more instances of digital video data;
upon determining that the second estimated likelihood exceeds the predefined threshold confidence level, processing the two or more instances of digital video data as inputs to the second one or more machine learning models to determine a second bin placement prediction and a second confidence value; and
upon determining that the second confidence value does not exceed a predefined threshold level of bin placement confidence, transmitting an electronic notification and providing the second two or more instances of digital video data to an operator system for evaluation.

5. The method of claim 4, further comprising:
receiving a bin placement determination from the operator system, based on a manual evaluation of the second two or more instances of digital video data; and
refining the second one or more machine learning models based on the bin placement determination and the second two or more instances of digital video data.

6. The method of claim 1, further comprising:
receiving a second two or more instances of digital video data captured using the two or more camera devices;
processing the second two or more instances of digital video data as inputs to the first one or more machine learning models to determine a second estimated likelihood that a second occurrence of the particular fulfillment center operation is depicted within the second two or more instances of digital video data; and
upon determining that the second estimated likelihood does not exceed the predefined threshold confidence level, transmitting an electronic notification and providing the second two or more instances of digital video data to an operator system for evaluation.

7. The method of claim 6, further comprising:
receiving data specifying whether the particular fulfillment center operation is depicted within the second two or more instances of digital video data from the operator system, based on a manual evaluation of the second two or more instances of digital video data; and
refining the first one or more machine learning models based on the received data and the second two or more instances of digital video data.

8. A system, comprising:
two or more camera devices positioned to capture video at a location within a fulfillment center environment;
one or more computer processors; and
a memory containing computer program code that, when executed by operation of the one or more computer processors, performs an operation comprising:
receiving two or more instances of digital video data captured using the two or more camera devices;
processing the two or more instances of digital video data using one or more machine learning models to determine that the two or more instances of digital video data depict an occurrence of a particular operation, wherein the particular operation comprises placing an item into a storage container within the fulfillment center environment;
updating data specifying contents of the storage container;
determining that an overage exists in the storage container within the fulfillment center environment, based on a mismatch between the data specifying the contents of the storage container and scan data specifying items scanned within the fulfillment center environment; and
generating and transmitting an electronic notification, indicating that the overage exists in the storage container.

9. The system of claim 8, the operation further comprising:
responsive to generating and transmitting the electronic notification, receiving training data specifying whether the two or more instances of digital video data actually depict the occurrence of the particular operation; and
upon determining that the one or more machine learning models incorrectly determined the occurrence of the particular operation, refining the one or more machine learning models based on the received training data.

10. The system of claim 8, wherein processing the two or more instances of digital video data using one or more machine learning models to determine that the two or more instances of digital video data depict an occurrence of a particular operation further comprises:
processing the two or more instances of digital video data as inputs to a first one or more machine learning models to determine an estimated likelihood that an occurrence of a particular fulfillment center operation is depicted within the two or more instances of digital video data, wherein the first one or more machine learning models comprise a Simple Vector Machine (SVM) model trained on a fully connected layer of a three-dimensional (3D) convolutional neural network.

11. The system of claim 10, wherein processing the two or more instances of digital video data using one or more machine learning models to determine that the two or more instances of digital video data depict an occurrence of a particular operation further comprises:
upon determining that the estimated likelihood exceeds a predefined threshold confidence level, processing the two or more instances of digital video data as inputs to a second one or more machine learning models to determine a bin placement prediction and a confidence value, wherein the second one or more machine learning models comprise a Region Convolutional 3D (R-C3D) Network, wherein the bin placement prediction indicates a predicted bin of a plurality of bins that an item was placed into as a result of the occurrence of the particular fulfillment center operation, and wherein the confidence value represents an estimated certainty that the item was placed into the predicted bin.

12. The system of claim 11, wherein updating data specifying contents of the storage container further comprises:
updating a data repository for a control system for the fulfillment center environment, based on the bin placement prediction and the confidence value, by at least in part generating and transmitting a database query configured to store an indication of the bin placement prediction and a corresponding confidence value in a database.

13. The system of claim 11, the operation further comprising:
   receiving a second two or more instances of digital video data captured using the two or more camera devices;
   processing the second two or more instances of digital video data as inputs to the first one or more machine learning models to determine a second estimated likelihood that a second occurrence of the particular fulfillment center operation is depicted within the second two or more instances of digital video data;
   upon determining that the second estimated likelihood exceeds the predefined threshold confidence level, processing the two or more instances of digital video data as inputs to the second one or more machine learning models to determine a second bin placement prediction and a second confidence value; and
   upon determining that the second confidence value does not exceed a predefined threshold level of bin placement confidence, transmitting an electronic notification and providing the second two or more instances of digital video data to an operator system for evaluation.

14. The system of claim 13, the operation further comprising:
   receiving a bin placement determination from the operator system, based on a manual evaluation of the second two or more instances of digital video data; and
   refining the second one or more machine learning models based on the bin placement determination and the second two or more instances of digital video data.

15. A method, comprising:
   determining, by a control system within a fulfillment center environment, to retrieve a first item from a first bin of a plurality of bins of a storage container;
   receiving an indication that the first bin of the storage container does not contain the first item;
   identifying a plurality of instances of digital video content that depict at least one fulfillment operation relating to the first item and the storage container, wherein the plurality of instances of digital video content were analyzed using one or more machine learning models to determine a plurality of items believed to be placed within the storage container;
   generating and transmitting an electronic notification to an operator system for review, wherein the electronic notification provides at least an indication of the identified plurality of instances of digital video content;
   receiving, responsive to transmitting the electronic notification, a correction to at least one of the plurality of items placed within the storage container; and
   updating data for the control system to adjust the plurality of items placed within the storage container, based on the received correction.

16. The method of claim 15, wherein the operator system is configured to output for display at least one instance of digital video content from the plurality of instances of digital video content, and wherein the operator system provides a graphical user interface through which an input can be provided, the input specifying a bin of the plurality of bins of the storage container into which the first item was placed, as depicted by the at least one instance of digital video content.

17. The method of claim 15, further comprising:
   upon receiving the indication that the first bin of the storage container does not contain the first item, determining a plurality of potential bin placements for the first item within the storage container, based on a plurality of outputs of the one or more machine learning models, wherein each of the plurality of outputs specifies a respective one of the plurality of bins and a respective confidence score representing an estimated likelihood that the first item was placed into a corresponding bin.

18. The method of claim 17, further comprising:
   selecting one or more potential bin placements of the plurality of potential bin placements, based on determining that the selected one or more potential bin placements have a corresponding confidence score that exceeds a predefined threshold level of confidence; and
   generating a graphical user interface depicting the selected one or more potential bin placements as suggested locations for the first item within the storage container.

19. The method of claim 15, further comprising:
   processing two or more instances of digital video content, from the plurality of instances of digital video content, as inputs to a first one or more machine learning models to determine an estimated likelihood that an occurrence of a particular fulfillment center operation is depicted within the two or more instances of digital video content, wherein the first one or more machine learning models comprise a Simple Vector Machine (SVM) model trained on a fully connected layer of a three-dimensional (3D) convolutional neural network, and wherein the particular fulfillment center operation comprises placing the first item into one of the plurality of bins of the storage container.

20. The method of claim 19, further comprising:
   upon determining that the estimated likelihood exceeds a predefined threshold confidence level, processing the plurality of instances of digital video content as inputs to a second one or more machine learning models to determine a bin placement prediction and a confidence value, wherein the second one or more machine learning models comprise a Region Convolutional 3D (R-C3D) Network, wherein the bin placement prediction indicates a predicted bin of the plurality of bins that the first item was placed into as a result of the occurrence of the particular fulfillment center operation, and wherein the confidence value represents an estimated certainty that the first item was placed into the predicted bin.

* * * * *